United States Patent [19]

Willis

[11] Patent Number: 4,606,733

[45] Date of Patent: Aug. 19, 1986

[54] SLATE BOX TURKEY CALL

[76] Inventor: Alvin D. Willis, Rte. 1, Travelers Rest, S.C. 29690

[21] Appl. No.: 698,034

[22] Filed: Feb. 4, 1985

[51] Int. Cl.⁴ .............................................. A63H 5/00
[52] U.S. Cl. .................................... 446/397; 446/419
[58] Field of Search ............... 446/181, 188, 189, 213, 446/214, 397, 402, 406, 413, 417, 418, 419, 420, 421, 422

[56] References Cited

U.S. PATENT DOCUMENTS

| | | | |
|---|---|---|---|
| 1,449,756 | 3/1923 | Jackson | 446/397 |
| 2,573,856 | 11/1951 | Malone, Sr. | 446/406 |
| 2,606,401 | 8/1952 | Boatwright | 446/397 |
| 2,643,483 | 6/1953 | Walker | 446/397 |
| 3,208,184 | 9/1965 | Wisor | 446/397 |
| 4,041,639 | 8/1977 | Funk | 446/397 |
| 4,310,986 | 1/1982 | Jacobs | 446/397 |

Primary Examiner—Robert A. Hafer
Assistant Examiner—D. Neal Muir
Attorney, Agent, or Firm—Cort Flint

[57] ABSTRACT

The invention relates to a turkey call device for reliably producing accurately simulated calls of a wild turkey. The device includes a sound box (10) having an acoustical chamber (26). An elongated rod (34) is carried in opposing sidewalls of the box for reciprocating motion and has affixed thereto a striker block (40). A striker peg (42) depends downwardly from the striker block to make a predetermined angle with a slate striker plate (22). A biasing spring connected between a point (48) on the striker block and a point (46) on the box has a line of force parallel to the line of contact between a peg contact surface (42b) and the striker plate (22). By locating the striker peg (42) between the elongated rod (34) and the biasing spring (44), wear of the plexiglass striker plate is automatically compensated for. The striker block and striker peg are pretensioned and start from the same point as determined by a stop (52) so that uniform signals are simulated at the beginning of repetitive sound strokes of the reciprocating rod.

22 Claims, 5 Drawing Figures

SLATE BOX TURKEY CALL

The invention relates to a device for simulating the mating, gathering, and feeding calls of wild turkeys.

Heretofore, devices have been proposed for simulating the calls of the wild turkey. The most conventional of these devices have been the use of a manual device comprising a slate box and a striking stick. The slate is held in one hand while the stick is held in the other. The stick is brought into contact with the slate in short strokes to simulate the calls of the wild turkey. The stick must strike the slate at a certain angle stroke length with a certain force in order to simulate the calls accurately. Much practice and skill need be developed in order to carry out the striking motion of the stick against the slate in order to accurately simulate the calls. For a beginner to be able to accurately simulate the calls by use of such a hand-held device as these is extremely difficult.

U.S. Pat. No. 4,041,639 has sought to eliminate one of these shortcomings by mounting an aluminum striker plate in a box and mounting a peg on top of the box so that the angle required for striking the plate is maintained at all times. Still, however, the length and force of the stroke is not regulated, and two hands are required for operating the device. The wood peg is relatively soft and wears out quickly. Smoothing of the wood peg contact surface also results in a change in the sound produced by the device as it becomes worn. The device seeks to alleviate this shortcoming by making the tip of the peg which contacts the striking plate changeable. The major shortcoming, however, is that a beginner or someone not skilled in the art of turkey calling must still spend considerable time practicing on the device since there is no regulation on the length and force of the stroke. Moreover, the device still requires two hands for operation rendering the device inoperable while the hunter holds a shotgun. When a turkey approaches, the device must be put down and the shotgun must be picked up, often resulting in loss of the most opportune moment for aiming and shooting at the turkey. Since two hands are required for operation, it is difficult to operate the device in rainy weather without getting it wet.

In U.S. Pat. No. 1,449,756, a sounding device is illustrated for simulating the call of the wild turkey. While the device may be operated by one hand, the accuracy of the sounds produced thereby is difficult to achieve. The elastic tensioning of the striker plate movement is unreliable and varies. The adjustability of the sounding board means that the device may easily become out of adjustment. Furthermore, the acoustical chamber configuration is not well defined and the acoustical characteristics difficult to control for distinct and accurate simulation of calls. A section of slate is caused to rub across a blade or bridge member causing vibration of the sounding board, rather than the slate producing the acoustical vibrations.

U.S. Pat. No. 2,573,856 discloses a turkey caller which may be operated by one hand. A reciprocating, spring-loaded rod is operated by a trigger for rubbing a wood insert block against a vibratory reed. The sound simulated by the device is difficult to produce in a calibrated and tuned manner. The acoustical performance is likewise difficult to predict owing to the wood against wood contact and the lack of well-defined acoustical chamber and characteristics.

Accordingly, an important object of the present invention is to provide a turkey call which accurately simulates the calls of a wild turkey in a reliable manner, and is easily tuned for use by a beginner without much likelihood of error.

Still another important object of the present invention is to provide a turkey call device for simulating the calls of a wild turkey in which the sound characteristics are preset and relatively unsusceptible to wear or maladjustment.

Still another important object of the present invention is to provide a turkey call device for simulating the calls of the wild turkey having precise specifications for its construction so that the device is tuned for accurate simulation of turkey calls on each stroke which can be accomplished with one hand.

Another important object of the present invention is to provide a turkey call having a slate striker plate and a striker peg whose stroke angle, length, and force are relatively preset and provided for at all times, particularly upon the repetitive start of each stroke so that accurate calls are simulated in a uniform manner.

SUMMARY OF THE INVENTION

The above objectives are accomplished according to the present invention by providing a device for simlating the calls of a wild turkey and the like which comprises an open top box having a bottom striker plate carried within the box forming a bottom. An acoustical chamber is formed below said striker plate for producing sounds which simlate the calls. An elongated reciprocating rod is carried by the box for effecting the sounds when moved in a first direction. A stop is carried on the rod for limiting the movement of the rod in a second direction opposite to the first direction. A striker block is carried on the rod having a predetermined mass for producing desired vibratory motions and sounds simulating the calls. A striker peg is carried by the striker block at a predetermined angle with respect to a vertical line and the peg is angled toward the first direction. A peg contact surface is formed on a free end of the striker peg contacting the striker plate. The contact surface is inclined at the predetermined angle to the striker plate for producing a desired vibratory motion on said striker plate when moved in the first direction simulating said calls. No sound is produced when the striker peg returns against the striker peg in the second direction. A biasing means urges the elongated rod towards the stop position and urges the striker block in an initial preset position for initiation of movement in the first direction only whereby a preset biasing force is applied to the striker peg against the striker plate. The initial preset position of the striker block and the initial preset biasing force of the striker peg against the striker plate produces uniform sounds from the initiation of start of movement of the striker block in repetitive strokes of the reciprocating rod.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
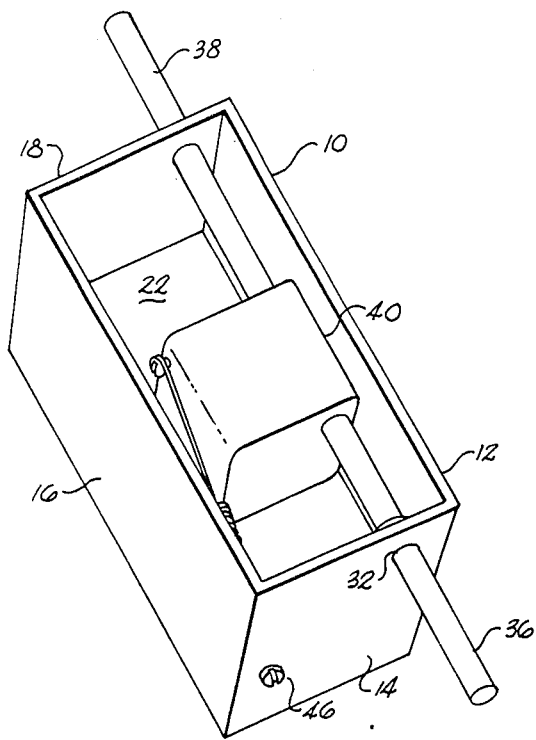
FIG. 1 is a perspective view illustrating a turkey call device constructed in accordance with the present invention.
Figure 2:
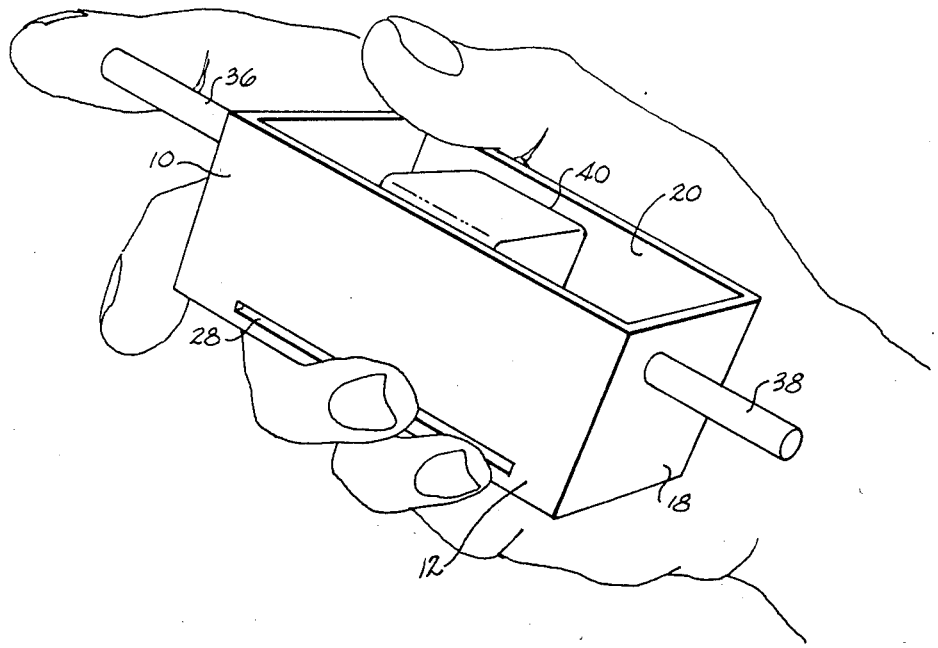
FIG. 2 is a perspective view illustrating a turkey call device constructed in accordance with the instant invention held and operated by one hand.

Referring now in more detail to the drawings, a turkey call device is illustrated for simulating the calls of a wild turkey. As illustrated, the device includes a box 10 having four sides 12 through 18. The box includes an open top 20 and a slate floor 22 which provides a striker plate. As can be seen in the drawings, the slate striker plate 22 is fixed in the sidewalls of the box a distance above a wood floor 24 of the box so that an acoustical chamber 26 is provided. There is an acoustical slot 28 formed in one of the walls 12 of the box for transmitting the acoustical sound or call produced by the device.

A pair of passage openings 30 and 32 are formed in opposing ends 14 and 18 of the box. There is a reciprocating plunger rod 34 having one end 36 received in the passage opening 32 and a remote end 38 formed in the passage opening 30. Fixed on the rod is a striker block 40 having a striker peg 42 carried by the bottom thereof. The elongated rod 34 is carried in the interior of the box 10 and provides reciprocating means for the striker block and peg so that the striker peg 42 engages against the slate striker plate 22.

There is biasing means in the form of a coil spring 44 which has one end fixed to the wall 14 at a first attachment point 46 and held in place by means of a conventional screw. The opposing end of the spring 44 is affixed to the block 40 at a second attachment point 48 and held to the block at this point by means of a screw 50 or any other means. The rod 34 is mounted through the block 40, off center to the peg, and pivots as held by the ends of the box 10. The spring 44 produces a downward force and urges the striker peg 42 against the slate striker plate 22 in a manner which automatically compensates for wear. Sound is produced by moving the striker peg 42 in a first direction as shown by the arrow.

Figure 3:
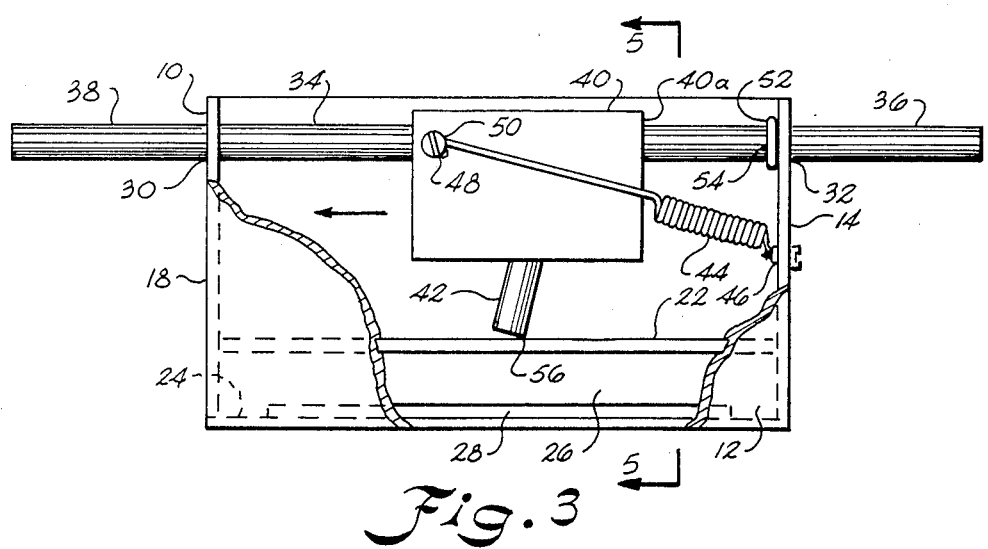
FIG. 3 is an elevation with parts cut away illustrating a turkey call device constructed in accordance with the present invention.

There is a stop means in the form of an "O" ring 52 which is fixed at a position on the elongated rod by any suitable means such as by a groove 54 which the elastic "O" ring is caused to set in. By this means, the movement of the elongated rod is fixed and limited in a second direction opposite to the first sound producing direction. With the "O" ring properly positioned on the elongated rod, and the length, force, and initial tensioning of the spring 44 known, the device is tuned in its initial starting position, as can best be seen in FIG. 3, so that the same sound is simulated each time a call is initiated from this starting point. The initial tuning and accurately simulated calls is further accomplished according to further aspects of the invention which will now be hereinafter described.

It has been found that a high-carbon steel wire spring such as used for music wire, having 36 coils per inch and a spring pressure of two pounds per square inch (2 psi) produces accurately simulated calls of the wild turkey in accordance with the other specified perameters of the turkey call of the instant invention. In one embodiment, a wire of 0.025 inches in diameter was utilized with a spring length of approximately two and three eighths inches (2⅜") long.

In the preferred embodiment, the "O" ring is positioned approximately one inch (1") from the side 40a of the striker block 40. The size, weight, and mass of the striker block 40 are critical. A striker peg 42 constructed from plexiglass is preferred. The striker block 40 must be made from a suitable type of hardwood such as maple. In one example of the invention, a block having a length of one and three-eights inches, a width of one and one-eighth inches, and a height of fifteen-sixteenths inch (1⅜"×1⅛"×15/16") is utilized. A plexiglass rod having a three-sixteenths inch (3/16") diameter is utilized. The spring 44 is attached between point 46 and 48 at an angle of approximately 13 degrees with the horizontal. The attachment points 46 and 48 are about two and one-half (2½") inches apart, so that the spring is stretched approximately one-eighth inch (⅛") and pre-tensioned when secured between the points 46 and 48, with the "O" ring in place as specified above. With this preset initial force and positioning of the striker peg and striker block, the calls of a wild turkey can be accurately simulated by having uniform starting conditions and tuning.

Figure 4:
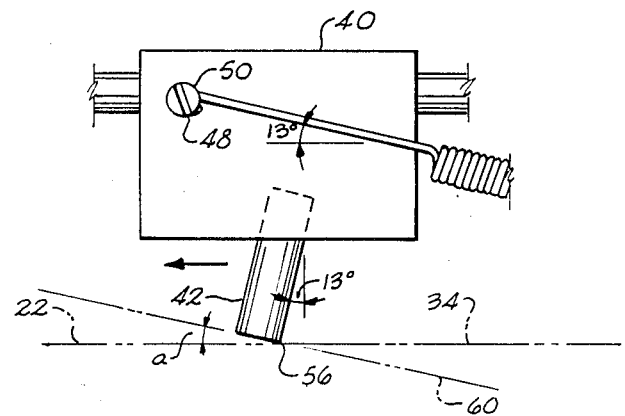
FIG. 4 is an enlarged elevation illustrating a configuration of a striker block and peg, and a slate striker plate as constructed in accordance with the present invention.

It has also been found that the striker peg 42 needs make an angle with the striker block 40 of approximately 13 degrees. The striker peg 42 is cut straight across the cylindrical peg in a right plane so that a contacting edge surface 56b of the striker peg contacts the slate striker plate 22 at an angle of approximately 13 degrees as can best be seen in FIG. 4. Thus, as inclined an approximate lower back half portion of the cut surface of the peg in the form of a crescent shaped edge engaging plate 22, produces a scratching motion on the slate striker plate that accurately simulates the calls of a wild turkey. No sound is produced by the return of the striker peg. The line of force of spring 44 between points 46 and 48 is parallel with a line of contact 60 between the peg and striker plate. The aforedescribed spring pressure is exerted at the point of contact.

A line between points 46 and 48 intersects a horizontal plane through or parallel to the longitudinal axis of rod 36 at the angle "a" of 13 degrees. Points 46 and 48 lie in a vertical plane generally parallel to a vertical plane passing through the longitudinal axis of rod 36.

The combination of the orientation of the preset pressure of the striker peg against the striker plate, the configuration of the peg and plate with respect to each other, the types of materials, and the configuration of the acoustical chamber together result in highly accurate turkey calls being simulated. In a preferred embodiment, the thickness of the slate striker plate 22 is approximately one-eighth inch (⅛").

Thus it can be seen that a highly advantageous construction for a turkey call can be had in accordance with the present invention. The gathering call of wild turkeys, commonly referred to as a "cluck" can accurately be simulated by holding the device in one hand and operating the end 36 of the rod 34 with one finger. The cluck is achieved by fairly short strokes of the rod, and the sound can be easily and quickly learnable and produced. The "yelp" or mating call and gathering call of the female turkey may be simulated by slightly longer strokes of the rod 34. The "cackle" of the hen is easily simulated by merely producing the yelp at a faster pace. Finally, the feeding "purr" may be simulated by a slower, more continuous stroke of the rod 34 in which some downward pressure is placed upon the rod by the finger. The other strokes are achieved by strictly linear pressure on the rod.

Figure 5:
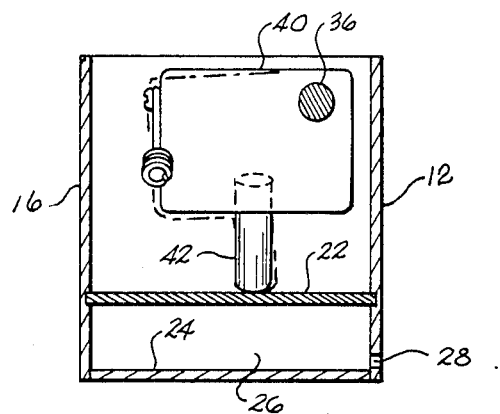
FIG. 5 is a sectional view taken along line 5—5 of FIG. 3.

Since the starting conditions of each of the above described turkey calls are kept uniform by the preset tensioning of the rod and peg and stop position, one can easily reproduce the simulated calls after practicing for a short time and developing a sound for the calls. The acoustical characteristics of the box are automatically maintained despite wear. The spring 44 always urges the striker block 40 and striker peg 42 against the slate striker plate 22, even if the bottom of the plexiglass should slightly wear, as can best be seen in the dotted line position of FIG. 5. The forward strike angle and contact angle of 13 degrees are maintained despite slight wear.

While a preferred embodiment of the invention has been described using specific terms, such description is for illustrative purposes only, and it is to be understood that changes and variations may be made without departing from the spirit or scope of the following claims.

What is claimed is:

1. A device for simulating the calls of a wild turkey and the like comprising:
   an open top box having a sidewall enclosure and a bottom enclosure;
   a striker plate forming a top wall of said bottom enclosure;
   an acoustical chamber formed in said bottom enclosure below said striker plate;
   a reciprocating striker block carried within said open top box for generally parallel movement to said striker plate;
   a cylindrical striker peg carried by said striker block for striking and moving relative to said striker plate at a predetermined angle;
   reciprocating means for moving said striker block and peg in a rectilinear motion in a first direction within said box over said striker plate and predetermined call strokes to simulate a desired one of a variety of said calls:
   a peg contact surface formed by a flat cut on an end of said striker peg and terminating at an outer arcuate edge of said cylindrical peg creating a crescent shaped striker edge surface which engages said striker plate at such a configuration and angle to produce a call sound emanating from said acoustical chamber during striker movement in such a manner that said call sound is produced only as said striker peg is moved in one direction of said reciprocating rectilinear motion to accurately simulate said wild turkey calls; and
   biasing means acting on said striking block urging said striker peg against said striker plate with a generally constant predetermined biasing force.

2. The device of claim 1 wherein said biasing means applies a predetermined force along a line generally parallel to a line of contact of said peg contact surface against said striker plate, said line of contact lying generally in the plane of said peg contact surface.

3. The device of claim 1 wherein said biasing means includes a coil spring connected between a point on said box and a point on said striker block wherein a line drawn between said two points is parallel with said line of contact of said striker peg.

4. The device of claim 3 including stop means for limiting said reciprocating rectilinear motion of said striker block in a second direction opposite to said first direction to provide a predetermined stop position for said block at which an initial preset biasing force is placed on said striker plate against said striker plate to produce accurate simulation of said calls from the initial point of movement of said striker block and peg in said one direction.

5. The device of claim 1 wherein said biasing means includes a uniform preset initial tensioning force urging said peg against said striker plate at the beginning of said reciprocating striker block movement facilitating uniform simulation of said calls.

6. The device of claim 1 wherein said striker peg is constructed from a plexiglass material.

7. The device of claim 1 wherein said peg contact surface includes a surface of said peg cut at a right plane to said peg.

8. The device of claim 1 wherein said predetermined angle is about 13 degrees.

9. The device of claim 1 wherein said predetermined baising means exerts a biasing force of said peg contact surface against said striker plate of about 2 psi.

10. The device of claim 1 wherein said striker block is constructed from hardwood and has a predetermined mass for producing vibrations to simulate said calls in a highly accurate manner.

11. A device for simulating the calls of a wild turkey and the like comprising:
    an open top box;
    a bottom striker plate carried within said open top box forming a bottom of said box;
    an acoustical chamber formed below said striker plate for producing said sounds to simulate said calls;
    an elongated reciprocating rod carried by said box for effecting said sounds when moved in a first direction; and
    a stop carried on said rod for limiting the movement of said rod in a second direction opposite to said first direction;
    a striker block carried on said rod having a predetermined mass for producing desired vibratory motions and sounds simulating said calls;
    a striker peg carried by said striker block at a predetermined angle with respect to a vertical line, said peg being angled toward said first direction;
    a peg contact surface formed on a free end of said striker peg contacting said striker plate, said contact surface being inclined at said predetermined angle to said striker plate for producing a desired vibratory motion on said striker plate when moved in said first direction which produces said sound simulating said calls and producing no sound when said striker peg returns against said striker peg in said second direction;
    biasing means urging said elongated rod towards said stop position and urging said striker block in a initial preset position for initiation of movement in said first direction only and applying a preset biasing force on said striker peg against said striker plate in a manner that said rod and striker peg begin a call stroke from the same stop position and under the same biasing force on each call stroke; and said initial preset position of said striker block and said initial present biasing force of said striker peg against said striker plate producing uniform sounds from the initiation of start of movement of said striker block in said first direction facilitating uniform simulation of said calls on repetitive strokes of said striker block and peg.

12. The device of claim 1 wherein said predetermined force of said biasing means acts through a point of contact of said contact surface of said peg against said striker plate.

13. The device of claim 12 wherein said biasing force is about 2 psi.

14. The device of claim 11 wherein said biasing means includes a coil spring constructed from a high carbon music wire having about 36 coils per inch and a diameter of about 0.025 inches.

15. The device of claim 14 wherein said spring has a length of approximately two and three-eighths inches.

16. The device of claim 15 wherein the distance from said stop to said attachment point of said spring on said striker block is approximately two and three-sixteenths inches.

17. The device of claim 11 wherein said biasing means includes a coil spring which has a force of about 2 psi and is prestretched about one-eight of an inch to provide said initial bias force.

18. The device of claim 11 wherein the configuration of said peg contact surface is formed by a right plane cut through said peg, said peg surface contacting said striker plate at a crescent shaped edge of said peg surface.

19. The device of claim 11 wherein said striker block includes a block of hardwood having a length of about one and three-eighths inches, a width of about one and one/eighth inches, and a height of about fifteen-sixteenths inches.

20. A device for simulating the calls of the wild turkey and the like comprising:

an open top box having a sidewall enclosure capable of being held in one hand and a bottom acoustical chamber;
a reciprocating plunger rod carried through opposing sides of said sidewall enclosure;
a striker block having a predetermined mass carried on said reciprocating rod for producing desired vibratory motion;
a striker plate carried within said open top box generally parallel to said plunger rod forming a top wall of said acoustical chamber;
a striker peg carried by said striker block engaging said striker plate at a predetermined angle;
a first attachment point formed on said striker block;
a second attachment point formed on said box;
a line between said first and second points intersecting a plain which includes a longitudinal axis of said rod at said predetermined angle;
said first and second points of attachment lying in a vertical plane generally parallel to a vertical plane passing through said longitudinal axis of said plunger rod;
a biasing means connected between said first and second points of attachment for exerting a biasing force on said striker peg against said striker plate; a peg contact surface approximately parallel to said line between said first and second points.

21. The bias of claim 20 wherein said striker peg is carried generally in a center of said striker block between said elongated plunger rod and said second point of attachment so that said block pivots downwardly toward said plate about said plunger rod longitudinal axis and said spring urges said striker peg downwardly against said striker plate whereby wear of contact surface of said striker peg is automatically compensated for as said striker block pivots downwardly during said wear.

22. The device of claim 20 wherein said first and second attachment points are spaced a distance apart which is greater than the length of said biasing means in its unbiased state so that an initial preset bias is placed on said striker peg against said striker plate.

* * * * *